(12) United States Patent
Aneder et al.

(10) Patent No.: US 9,541,101 B2
(45) Date of Patent: Jan. 10, 2017

(54) HYDRAULIC DRIVE

(71) Applicant: HAWE HYDRAULIK SE, Munich (DE)

(72) Inventors: Georg Aneder, Emmering (DE); Engelbert Zwingler, Baiern/Antholing (DE)

(73) Assignee: HAWE HYDRAULIK SE (DE)

( * ) Notice: Subject to any disclaimer, the term of this patent is extended or adjusted under 35 U.S.C. 154(b) by 272 days.

(21) Appl. No.: 14/453,874

(22) Filed: Aug. 7, 2014

(65) Prior Publication Data

US 2015/0040555 A1 Feb. 12, 2015

(30) Foreign Application Priority Data

Aug. 8, 2013 (EP) .................................. 13179710

(51) Int. Cl.
*F16D 31/02* (2006.01)
*F15B 13/02* (2006.01)
(Continued)

(52) U.S. Cl.
CPC ............. *F15B 13/028* (2013.01); *B25B 27/10* (2013.01); *F15B 11/028* (2013.01); *F15B 11/0423* (2013.01); *F15B 11/10* (2013.01); *F15B 13/0401* (2013.01); *F15B 13/0405* (2013.01); *F15B 13/0426* (2013.01); *F16H 61/4078* (2013.01); *F15B 11/15* (2013.01); *F15B 2211/31558* (2013.01);
(Continued)

(58) Field of Classification Search
CPC ....... F15B 11/0423; F15B 11/10; F15B 11/15; F15B 13/0405; F15B 13/0426
See application file for complete search history.

(56) References Cited

U.S. PATENT DOCUMENTS 5,355,773 A * 10/1994 Winkels ................. F15B 11/02
91/452
6,276,186 B1 8/2001 Frenken
(Continued)

FOREIGN PATENT DOCUMENTS

| DE | 102006026552 A1 | 12/2007 |
| EP | 0944937 A1 | 9/1999 |
| EP | 2448720 A1 | 5/2012 |

OTHER PUBLICATIONS

European Search Report Dated Dec. 4, 2013, Application No. 13179710.2-1754, Applicant HAWE Hydraulik SE, 4 Pages.

*Primary Examiner* — Michael Leslie
(74) *Attorney, Agent, or Firm* — Brooks Kushman P.C.

(57) ABSTRACT

In a hydraulic drive of a tool, a piston is adapted to be acted upon by a pump via a pressure limiting seat valve and a parallel switching seat valve of a valve arrangement. A restriction is provided in a pressure line upstream of the pressure limiting seat valve which is connected to a tank on the flow-off side. A drain line leads from a working chamber of the piston via the switching seat valve to the tank. A closing side is adapted to be acted upon by pressure and an opening side is adapted to be acted upon by a force generated when the pressure limiting seat valve responds. The pump is adapted to be switched off when the maximum operating pressure has been reached, so that the piston will execute a return stroke. A pressure-increasing restriction is provided on the flow-off side of the pressure limiting seat valve.

18 Claims, 4 Drawing Sheets

(51) Int. Cl.
  *F15B 13/04*      (2006.01)
  *F15B 11/10*      (2006.01)
  *F15B 11/042*     (2006.01)
  *F16H 61/4078*    (2010.01)
  *B25B 27/10*      (2006.01)
  *F15B 11/028*     (2006.01)
  *F15B 13/042*     (2006.01)
  *F15B 11/15*      (2006.01)

(52) U.S. Cl.
  CPC ............... *F15B 2211/329* (2013.01); *F15B 2211/40507* (2013.01); *F15B 2211/41572* (2013.01); *F15B 2211/50509* (2013.01); *F15B 2211/5159* (2013.01); *F15B 2211/528* (2013.01); *F15B 2211/55* (2013.01); *F15B 2211/7052* (2013.01); *F15B 2211/76* (2013.01); *Y10T 137/7758* (2015.04)

(56) References Cited

U.S. PATENT DOCUMENTS

| | | | |
|---|---|---|---|
| 7,441,406 B2 * | 10/2008 | Stingl | F15B 11/0445 91/444 |
| 7,908,963 B2 | 3/2011 | Frenken | |
| 8,776,513 B2 * | 7/2014 | Nishioka | F15B 11/0423 60/478 |
| 9,360,028 B2 * | 6/2016 | Zwingler | F15B 11/0423 |
| 2012/0160065 A1 | 6/2012 | Frenken | |

\* cited by examiner

HYDRAULIC DRIVE

CROSS-REFERENCE TO RELATED APPLICATIONS

This application claims foreign priority benefits under 35 U.S.C. §119(a)-(d) to European patent application number EP 13 179 710.2, filed Aug. 8, 2013, which is incorporated by reference in its entirety.

TECHNICAL FIELD

The disclosure relates to a hydraulic drive of the type specified as well as to a valve arrangement.

BACKGROUND

In the case of the hydraulic drive of the type in question, which is known from EP 2 448 720 A1, a large cross-section to the tank is abruptly opened, when the pressure limiting seat valve has responded and as soon as also the larger pressure application area of the valve piston has pressure applied thereto. In the case of an at least approximately simultaneous deactivation of the pump (FIGS. 1, 2), a large volume flow abruptly flows through said large cross-section into the tank and the pressure rapidly collapses at the restriction defined by a valve cone portion of the switching seat valve. Following this, the pressure limiting seat valve returns immediately to its shut-off position. At the valve cone of the switching seat valve, a force is created on the opening side, which opens the switching seat valve and connects the working chamber to the tank via a nozzle limiting the return stroke velocity of the piston. If desired, the return stroke of the piston is stopped at a selectable return stroke position via a volume flow pulse by switching on the pump again, and the switching seat valve is closed. Even if the electric drive motor of the pump is switched off as fast as possible, e.g., by a reversal of poles, it will nevertheless be impossible to avoid coasting of the pump, which will cause a volume flow pulse in the pressure line. Although the pressure limiting seat valve, which has already been closed, will no longer respond to said volume flow pulse, the switching seat valve may respond thereto. Due to the interaction between the pressure limiting seat valve, which responds abruptly to open towards the tank, and the switching seat valve, the hydraulic drive has implemented therein a time logic, which is not defined unequivocally and which, under unfavorable operating conditions, may be outwitted by the coasting volume flow, whereby the switching seat valve will be closed unintentionally or not opened and the piston will either not even start its return stroke or discontinue it prematurely. This time logic is not able to unequivocally differentiate between the volume flow pulse occurring when the pump is switched on intentionally, e.g., for stopping the return stroke, and the coasting volume flow pulse.

DE 10 2006 026 552 A1 relates to a similar hydraulic drive.

Another hydraulic drive of interest is that according to EP 0 944 937 A1, in which a single return valve fulfils the functions of limiting the maximum operating pressure and switching to the piston return stroke, said piston executing its return stroke, however, up to an end position determined by the load acting permanently on the piston. The return stroke can here not be stopped at a selectable return stroke position by switching on the pump again.

SUMMARY

It is an object of the present disclosure to configure a stoppable hydraulic drive of the type specified at the beginning such that it operates more reliably, in spite of an unavoidable coasting volume flow pulse of the pump, and to provide a reliably operating valve arrangement.

Since the switching seat valve is, when the pressure limiting seat valve responds and is kept open, opened on the opening side either hydraulically or mechanically by the raised pressure on the flow-off side of said pressure limiting seat valve, said pressure limiting seat valve responding so to speak with delay in view of the rise in pressure and the pressure vanishing not abruptly from the pressure limiting seat valve into the tank, the hydraulic drive has structurally implemented therein a logic, which is not outwitted by a coasting volume flow pulse of the pump, since the force acting on the opening side is so strong and still present, if a coasting volume flow pulse should generate a pressure pulse on the closing side of the pressure limiting seat valve. It can be assumed that, in view of the rise in pressure via the restriction means, the pressure limiting seat valve will remain at its open position in any case, even if the pump should be switched off and/or as long as a volume flow flows, until the switching seat valve has been adequately opened, even if a coasting volume flow pulse should occur whose effect is mitigated through the pressure limiting seat valve which is still open. The operational reliability of the hydraulic drive is thus significantly improved. Surprisingly enough, the structurally implemented logic is able to differentiate between the coasting volume flow pulse of the pump and a volume flow pulse which is intentionally generated by temporarily switching on the pump, e.g., for stopping the return stroke of the piston, so that the pressure limiting seat valve will only be closed when such closing is actually wanted. The pressure limiting seat valve remains open so to speak independently of the pump coasting period after opening. The motor control need not switch in an extremely precise manner. It is even imaginable to do without a motor control and to operate the motor only manually by an on-off switch.

In the valve arrangement the pressure limiting seat valve, after having responded, remains open as long as a volume flow flows in the pressure line, and the switching seat valve is reliably opened and kept open, irrespectively of whether the volume flow is produced intentionally until the switching seat valve responds or originates from unavoidable coasting of a pump which is adapted to be operated in a switch-off mode and which feeds the pressure line. This leads to a higher operational reliability, since it is excluded that the switching seat valve is either not correctly opened or immediately closed again due to coasting of the pump. The valve arrangement is expediently used e.g., for hydraulic drives of tools, in which the pressure limiting seat valve limits a maximum operating pressure and the pump is switched off approximately when the switching seat valve responds, the switching seat valve then relieving the hydro-consumer to the tank and initiating the return stroke thereof. Also other cases of use are, however, imaginable for the valve arrangement.

In this context it is important that the pressure limiting seat valve is unblocked and kept open only by a raised pressure generated from a volume flow in the pressure line upstream of the restriction, but not by a pressure medium flowing off the working chamber of the piston. This also allows a rapid return stroke of the piston, which is only decelerated by the restriction resistance via the switching seat valve and in the drain line.

Thanks to the structurally implemented, error-proof logic, the piston can be stopped at any desired return stroke position within the return stroke by switching on the pump for a limited period of time.

Alternatively, the direction of movement of the piston can be reversed at any desired return stroke position by switching on the pump again and by keeping it running. Both the stopping as well as the reversal of direction are important demands that have to be satisfied by the hydraulic drive, so that it will not be necessary to wait for a period corresponding to the whole return stroke between individual operating cycles of the tool and so as to prevent inexpedient volume flows from circulating.

According to a structurally simple embodiment, the restriction means is defined either by a restriction point arranged in a tank line leading from the flow-off side of the pressure limiting seat valve to the tank and/or by the tank line itself, or it is defined at a suitable location of the pressure limiting seat valve, e.g., between the large-diameter part of the valve piston and a neighboring chamber wall.

According to an expedient embodiment, in which the force on the opening side is generated hydraulically, the pressure limiting seat valve and the switching seat valve are configured as structurally separate valves, preferably as screw-in valves, and are hydraulically connected via a signal line extending from the flow-off side of the pressure limiting seat valve to the closing side in a chamber of the switching seat valve accommodating a valve piston. The switching seat valve is thus not opened by a decrease in pressure on the inflow side of the pressure limiting seat valve, but by the raised pressure delaying the response of the pressure limiting seat valve, said raised pressure being applied to an adequately large pressure application surface in the switching seat valve, which generates a strong force that cannot be overcome by the pressure on the closing side, not even if a coasting volume flow should occur.

For reasons of reliability, i.e. in order to support the prevention of uncontrolled closing of the switching seat valve, the latter may include a mechanical locking device by means of which it is mechanically locked at the respective switching position. The force of the locking device is so strong that it will be overcome neither by a pressure pulse on the closing side caused by a coasting volume flow pulse nor by the occurrence of back pressure acting via the restriction nor by a flow-dynamic suction effect in the pressure limiting seat valve.

Alternatively or additively, the switching seat valve may additionally be acted upon by tank pressure on the opening side, so that the switching seat valve can reliably be kept open even if the pressure limiting seat valve occupies again the shut-off position.

In addition, it will be expedient to configure the switching seat valve such that it does not comprise a spring, a circumstance which will simplify its structural design as well as its function. This, however, does not exclude the provision of at least a weak spring acting e.g. on the opening side.

According to an expedient embodiment in which the switching seat valve is hydraulically opened, said switching seat valve comprises a closing cone in a chamber connected to the tank, said closing cone being connected to a valve piston, which is displaceable within the housing, and cooperating with a seat that is open towards the working chamber, and, in an annular chamber of the housing connected to the pressure line, the valve piston comprises as closing side an annular pressure application surface corresponding to only a fraction of a larger pressure application surface of the valve piston on the opening side in a chamber connected to the signal line. The raised pressure on the flow-off side of the pressure limiting seat valve generates, via the larger pressure application surface on the opening side, a sufficiently strong force for a sufficiently long period of time, said strong force opening the switching seat valve in a reliable manner and keeping it open.

According to an expedient embodiment, the lock comprises at least one ball, which is resiliently loaded radially inwards, preferably by an O-ring, in a radial bore of the housing of the switching seat valve, and locking recesses, which correspond to the closed and open positions of the valve piston, in the circumference of the valve piston. The locking recesses are arranged preferably adjacent to the larger pressure application surface of the valve piston i.e. on a diameter of optimum size. Alternatively or additively, the tank pressure on the opening side may also act on a pressure application surface that is smaller than the larger pressure application surface, e.g. via a shuttle valve, which is adapted to have alternately applied thereto the raised pressure and the tank pressure and which transmits the respective higher pressure into the chamber and onto the valve piston.

According to another advantageous embodiment, in which the force on the opening side is generated mechanically, the switching seat valve and the pressure limiting seat valve are arranged in a common housing. The housing is connected via a line to a working chamber, via two parallel pressure line branches to the pump, and via a tank line to the tank. A hollow stepped piston preferably including the restriction and having an external seating area is, as a valve piston of the switching seat valve, displaceably guided within the housing on a side of the valve piston of the pressure limiting seat valve, which faces away from the smaller pressure application surface and which communicates with the tank, said valve piston having the larger pressure application surface, and said stepped piston cooperating with a seat formed in the housing between a tank connection and a pressure line connection as well as a connection of the line leading to the working chamber. In this switched-on state of the pump, the stepped piston is kept on the seat by the pressure in the pressure line until the pressure limiting seat valve responds, the pressure line being simultaneously connected to the working chamber. When the pressure limiting seat valve responds and is kept open, the valve piston of the pressure limiting seat valve having the larger pressure application surface operates the stepped piston mechanically, whereupon said stepped piston is raised from the seat and connects the working chamber via the open seat to the tank, with the pump having possibly already been switched off. The pressure limiting seat valve may comprise a mechanical lock also in this embodiment.

According to an expedient embodiment, the pressure line branch leading to the switching seat valve communicates with a spring chamber facing away from the valve piston of the pressure limiting seat valve and is connected to the line connection leading to the working chamber beyond the seat via at least one passage extending axially through the stepped piston and including preferably the restriction. In this way, also the pressure of the pressure line acting on the pressure limiting seat valve, or rather on the stepped piston thereof, on the closing side is tapped upstream of the restriction.

According to a structurally simple embodiment, the restriction means for rising the pressure in the pressure limiting seat valve may be formed near the larger pressure application surface between the outer circumference of the valve piston and a wall of a chamber, which contains the piston such that it is displaceable therein and which, when the pressure limiting seat valve responds, is adapted to be acted upon on one side of the piston with the pressure in the pressure line, and which is connected to the tank on the opposite side of the piston, with which the latter displaces the stepped piston for opening the switching seat valve. In this chamber also the stepped piston is acted upon by the tank pressure on the opening side of the switching seat valve. When the pressure limiting seat valve responds, pressure medium does not flow abruptly to the tank, but the flow of pressure medium is delayed via the restriction means, whereby the pressure limiting seat valve is kept open as long as a volume flow flows in the pressure line.

Embodiments of the subject matter of the disclosure are explained making reference to the drawings.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
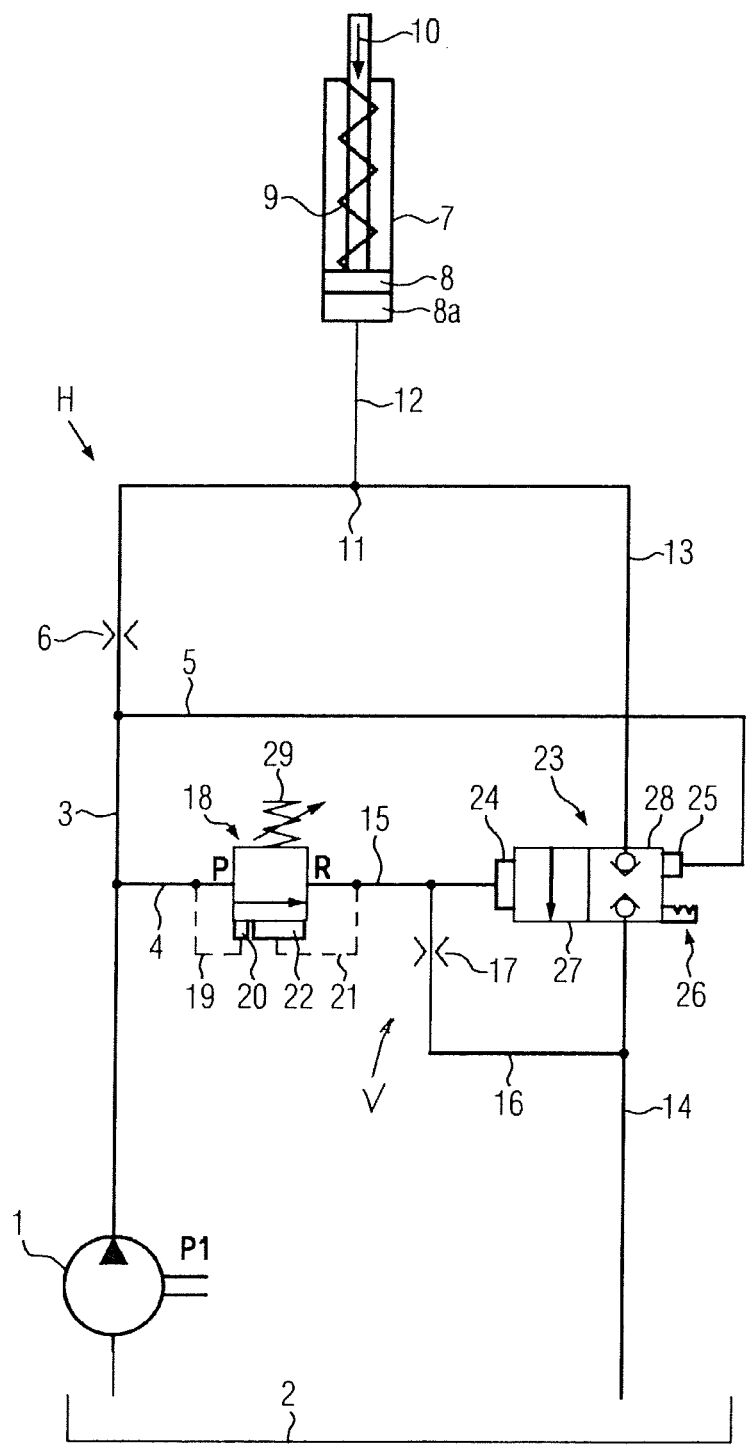
FIG. 1 shows a block diagram of a first embodiment of a hydraulic control.
Figure 3:
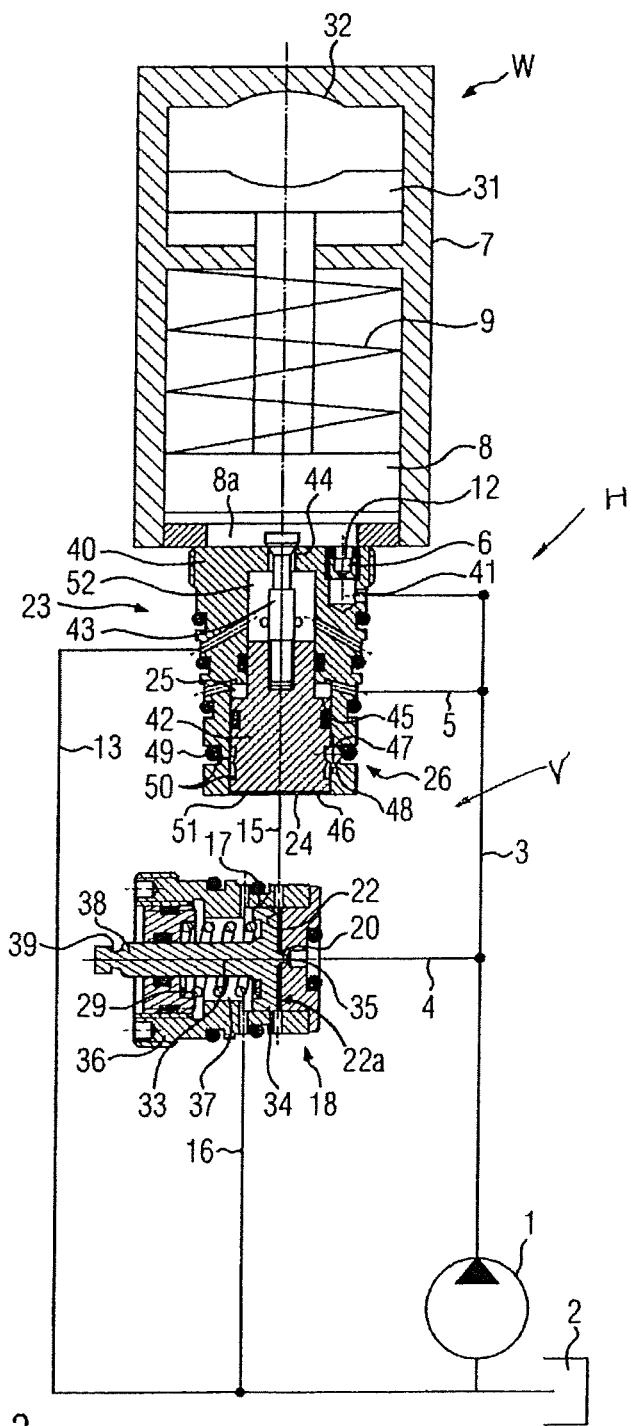
FIG. 3 shows a block diagram with axial sectional views of the first embodiment, in a pressureless state.

FIGS. 1 and 3 illustrate as a block diagram in FIG. 1 and as a block diagram with axial sections in FIG. 3 an embodiment of a hydraulic drive H used e.g. in tools W (FIG. 3) employed for pressing e.g., mounting elements in the field of sanitary engineering. When the hydraulic drive H is used for this kind of work, it is important that a predetermined maximum operating force is applied during each correct operating cycle, that the tool or rather its drive is switched off when the maximum operating force has been reached, and that approximately simultaneously a return stroke is started, which is either executed completely or stopped at an arbitrary return stroke position or continued there by a new working process.

The hydraulic drive in FIG. 1 comprises a pump 1, which is adapted to be operated e.g., by an electric motor (not shown) in a switch-off mode and which sucks pressure medium from a tank 2 and conveys it into a pressure line 3. Pressure line branches 4, 5 branch off from the pressure line 3 and a restriction 6 is provided downstream of the pressure line branch 5. The pressure line 3 leads downstream of the restriction 6 to a branch point 11 from which a line 12 leads into a working chamber 8a of a hydro-consumer 7, e.g., a hydraulic cylinder, in which a piston 8 can be acted upon on one side thereof against a permanent load (either a spring 9 and/or a load 10), said piston 8 displacing according to FIG. 3 e.g., a tool component 31 of the tool W relative to a fixed tool component 32.

From the branch point 11 also a drain line 13 leads to a tank line 14. The pressure line branch 4 leads to a pressure limiting seat valve 18 from which a signal line 15 leads to a switching seat valve 23 on the flow-off side, said switching seat valve 23 being arranged between the drain line 13 and the tank line 14 and consisting e.g., of an at least pressure pilot controlled 2/2-way seat valve. A tank line 16 branches off from the signal line 15 and leads here to the tank line 14, which includes a restriction means 17 or is configured as a restriction means. The restriction means 17 may, as will be explained hereinbelow, also be accommodated in the pressure limiting seat valve 18.

A control line 19 branches off from the pressure line branch 4 and leads to a smaller pressure application surface 20 of the pressure limiting seat valve 18, whereas a control line 21 leads from the signal line 15 to a much larger pressure application surface 22 of the pressure limiting seat valve, which is spring loaded by means of an adjustable spring 29. The switching seat valve 23 has an opening side 24 having the signal line 15 connected thereto and having a pressure application surface which is much larger than that of a closing side 25 of the switching seat valve 23, to which the pressure line branch 5 leads. The switching seat valve 23 is adapted to be switched in a pressure-dependent manner between a closed position 28 and an open position 27, is preferably configured without a spring, and includes in the embodiment shown in FIGS. 1 and 3 optionally a mechanical lock 26, which mechanically arrests the closed and the open position. As an alternative which is not shown and similar to the embodiment shown in FIGS. 3 and 4, the pressure in the tank line 14 may act as a holding pressure on a comparatively small pressure application surface on the opening side 24, in addition to or as an alternative to the mechanical lock 26.

In the concrete embodiment shown in FIG. 3, which corresponds to the symbolic block diagram according to FIG. 1, the pump 1 is adjusted, e.g., at the spring 29, when the maximum operating force is reached or has been reached, i.e., when the pressure limiting seat valve 18 responds, switched off via a control which is not shown, and switched on, according to requirements, only for a short period of time, e.g., by means of a manual switch, for stopping the return stroke of the piston 8 at an arbitrary return stroke position, or switched on again for reversing the direction of the piston 8 at each return stroke position.

The pressure limiting seat valve 18 includes the smaller pressure application surface 20 on a pin-shaped extension of a valve member 33 in the form of a large-diameter piston 34 with a shaft 38 and a manual emergency operation application point 39, the pin-shaped extension of the valve member 33 being pressed by the spring 29 in the direction of closing into a small bore 35 having the pressure line branch 4 connected thereto. The valve closing member 33 is displaceably guided in a housing 36, the piston 34 defining with its outer circumference and the inner wall of the housing 36 the restriction means 17, which is effective between a chamber 22a and a spring chamber 37. The larger pressure application surface 22 of the piston 34 is located in the chamber 22a. In addition, said chamber 22a is connected via the signal line 15 to a chamber 51 in a housing 40 of the switching seat valve 23. In this chamber the opening side 24, which is defined e.g., by a circular surface 46 at the end of a valve piston 42, is acted upon by the pressure in the signal line 15. The spring chamber 37 of the pressure limiting seat valve 18 communicates with the tank line 16. The housing 36 is screwed into a housing bore (not shown), i.e., the pressure limiting seat valve 18 is, like the switching seat valve 23, expediently configured and installed as a screw-in valve. Alternatively (not shown), these valves and their components may be accommodated in a block.

In the present embodiment, the switching seat valve 23 is optionally installed directly on the bottom of the hydroconsumer 7 and includes in the housing 40 in a chamber 52 connected to the tank line 13 a valve cone 43, which is connected to the valve piston 42 and which cooperates with a seat 44 that is open towards the working chamber 8*a*. The valve piston 42 is a stepped piston, the smaller pressure application surface of which has applied thereto in said chamber 52 the pressure in the tank line 13 in the closing direction, and comprises there the closing side 25 as an annular pressure application surface 45, which is adapted to have applied thereto the pressure in the pressure line 3 via the pressure line branch 5.

The mechanical lock 26 explained on the basis of FIG. 1 comprises at least one ball 47, which is movable in a radial bore 48 of the housing 40, said ball 47 being resiliently acted upon inwards e.g., by an O-ring 49 and cooperating with locking recesses 50 formed in the circumference of the valve piston 42 so as to mechanically fix the valve piston 42 in the closed and in the open position of the switching seat valve 23. If, additively or alternatively, also the pressure of the tank line 13 should be applied to the opening side 24 in the opening direction (as in the case of FIG. 2), a connection line (not shown) may, as also the signal line 15, lead from the chamber 52 to a shuttle valve whose central connection applies pressure to the chamber 51 in the housing 40, said shuttle valve transmitting the respective higher pressure into the chamber 51, or the tank line 13 may be connected to the chamber 51 via an additional restriction.

Furthermore, in the embodiment according to FIG. 3, the restriction 6 is accommodated in the housing in the line 3 terminating in the working chamber 8*a* via a bored connection 41 in the housing 40, said restriction 6 being e.g., configured as a screw-in insert 12.

Function of the Embodiment According to FIGS. 1 and 3:

FIG. 3 illustrates the pressureless state with the pump 1 switched off. When the pump 1 is switched on, pressure medium flows through the restriction 6 into the working chamber 8*a* and the piston 8 starts its upward working stroke. In the restriction 6 a pressure difference is created so that, via the pressure line branch 5, the pressure effective on the closing side 25 will be higher than that in the working chamber 8*a*. The switching seat valve 23 is first held in the shut-off position shown at the seat 44, possibly without an incorporated spring. The pressure limiting seat valve 18 first remains at the position shown, until the tool W has executed an operating cycle and the maximum operating pressure is reached in the pressure line 3 due to the increasing motion resistance of the piston 8, which acts on the smaller pressure application surface 20. The closure member 33 is lifted from the bore 35 against the force of the spring 29, so that the maximum operating pressure abruptly acts on the much larger pressure application surface 22 on the piston 34 and the pin-shaped extension with the smaller pressure application surface 20 is fully removed from the bore 35. Simultaneously, the maximum operating pressure is transmitted from the chamber 22*a* via the signal line 15 into the chamber 51 and there to the opening side 24 of the valve piston 42, so that the switching seat valve 23 will fully open and connect the working chamber 8*a* to the tank line 13. The piston 8 starts its return stroke under the force of the spring 9 or a load 10. Due to the restriction means 17 in the pressure limiting seat valve 18, the maximum operating pressure decreases with delay into the spring chamber 37 and from said spring chamber 37 via the tank line 16 towards the tank. The force generated hydraulically on the opening side 24 from the raised pressure in the signal line 15 has already overcome the much weaker force on the closing side 25, which, as the pressure decreases in the pressure line 3, vanishes to a very large extent anyhow. The switching seat valve 23 is fully opened and kept open in a reliable manner. During the opening process, the at least one ball 47 jumps into the locking recess 50 corresponding to the open position, and keeps the valve cone 43 remote from the seat 44. As soon as the maximum operating pressure has decreased via the restriction means 17 towards the tank 2 to such an extent that the force of the spring 29 is again predominant, the pressure limiting seat valve 18 returns to its depicted shut-off position, whereas the switching seat valve 23 remains open and the piston 8 continues its return stroke. If the return stroke is continued until the final position has been reached, the switching seat valve 23 is still in the open position. If the return stroke of the piston 8 should be stopped at a selected return stroke position, the pump 1 is switched on for a predetermined period of time for generating a volume flow pulse, which, without causing the pressure limiting seat valve 18 to respond, generates thanks to the pressure difference via the restriction 6 on the closing side 25 of the valve piston 42 a sufficiently strong force that overcomes the effect of the locking device 26 and closes the switching seat valve 23 (as shown in FIG. 3), so that the piston 8 will be stopped and stand still. If, however, the pump 1 is switched on again at a selected return stroke position and maintained in the switched-on state, the piston 8 will reverse its direction of movement after the switching seat valve 23 has been closed, and a new operating cycle will be initiated.

Thanks to the cooperation between the rise in pressure in the signal line 15 through the restriction means 17 and the larger pressure application surface on the opening side 24, the hydraulic drive H has structurally implemented therein a logic which is able to differentiate whether a volume flow pulse occurring in the pressure line 3 results from coasting of the pump after switching off of the latter or from an intentional switching on of the pump, so that it can be guaranteed that in the case of a coasting volume flow pulse the switching seat valve will not stand still at or move to the closed position in an uncontrolled manner.

Figure 2:
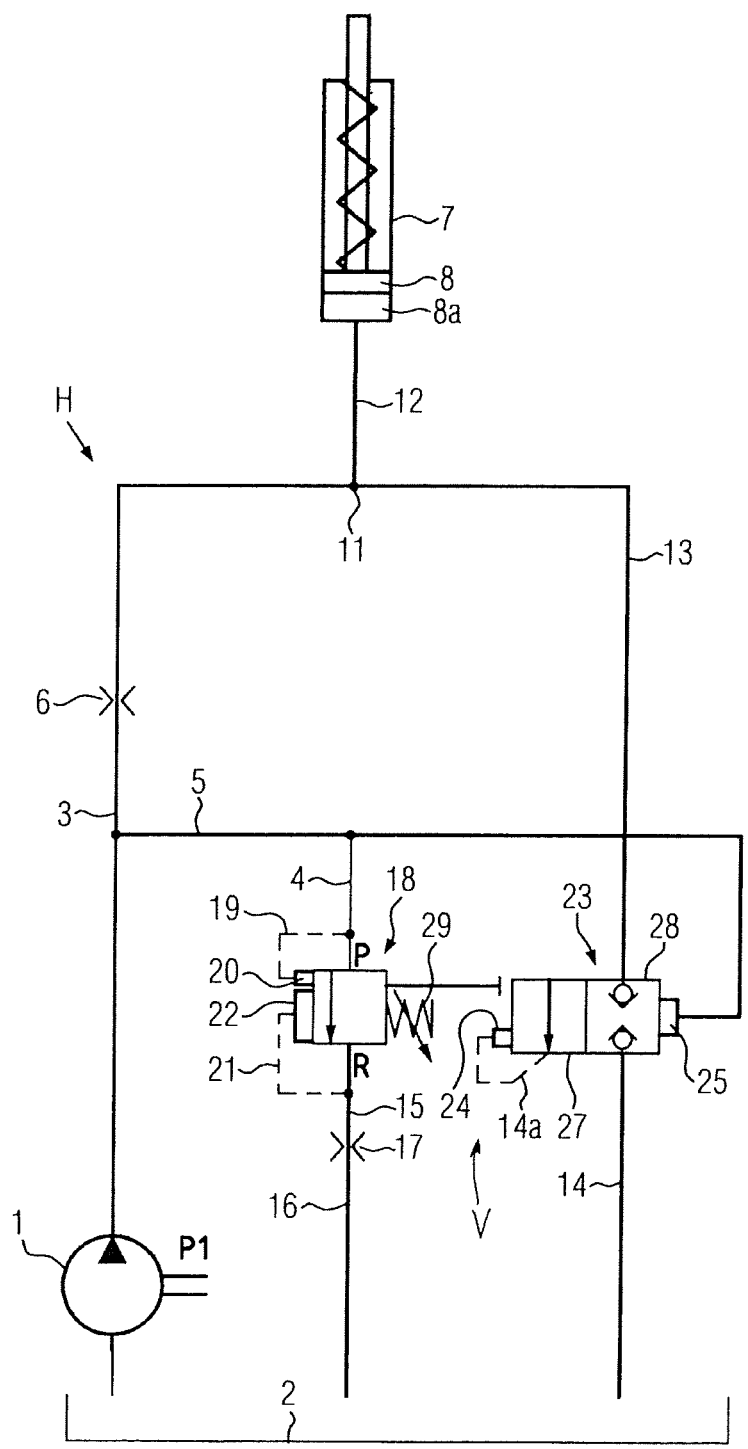
FIG. 2 shows a block diagram of a further embodiment of a hydraulic control.
Figure 4:
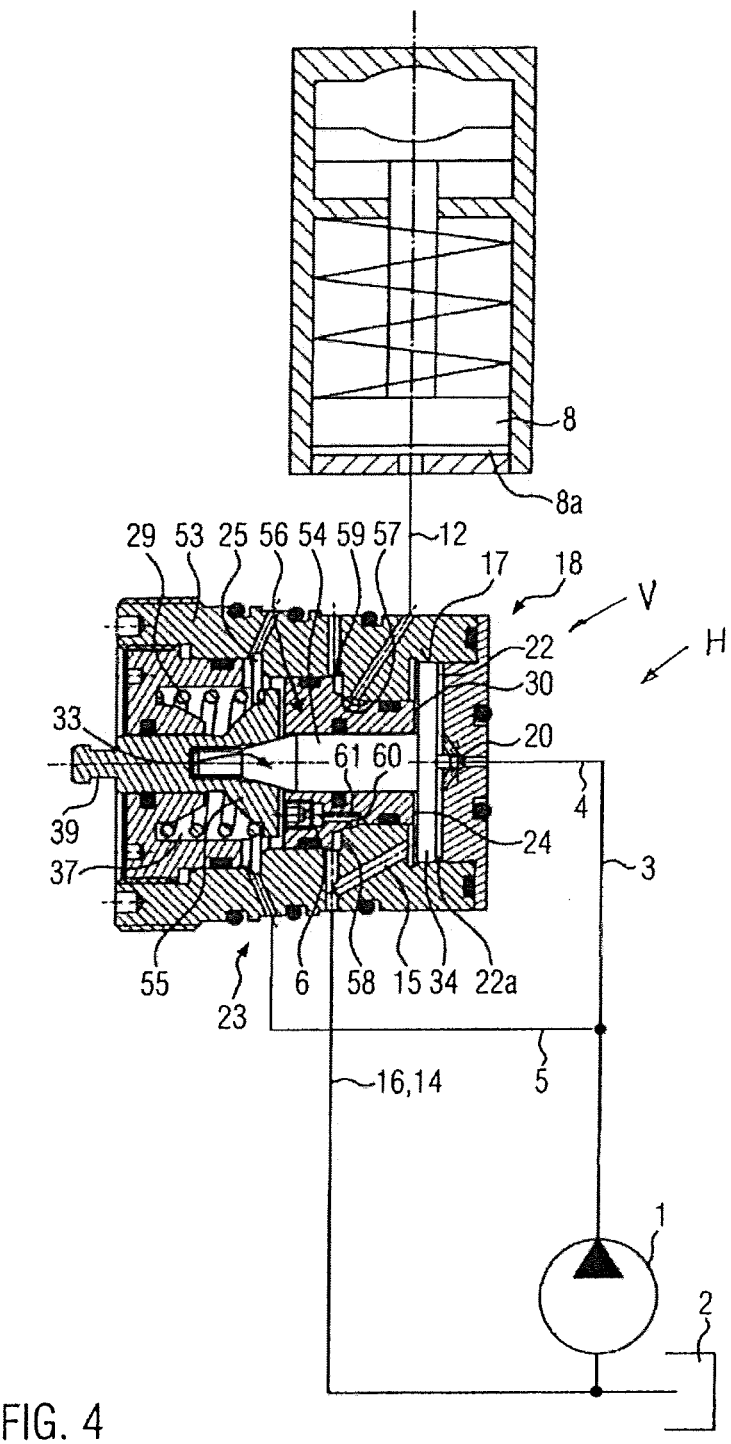
FIG. 4 shows a block diagram with axial sectional views of the further embodiment according to FIG. 2 in a pressureless state.

According to the additional embodiment of FIGS. 2 and 4, which functionally corresponds to the first embodiment, identical components being highlighted by identical reference numerals, the force generated by the valve piston on the closing side, when the pressure limiting seat valve 18 responds and is kept open, is mechanically transmitted to the opening side of the switching seat valve 23.

In FIG. 2 the pressure line branch 4 to the inflow side of the pressure limiting seat valve 18 branches off from the pressure line branch 5 to the closing side 25 of the switching seat valve 23. The tank line 16 with the restriction means 17 (which could also be structurally accommodated in the pressure limiting seat valve 18) is here conducted from the flow-off side directly to the tank 2. The switching seat valve 23 has on the opening side 24 a smaller pressure application surface than on the closing side 25 and is there acted upon by the pressure from the tank line 14 via a control line 14*a*, so that the use of the locking device 26 shown in FIGS. 1 and 3 may be, but need not be dispensed with. The pressure limiting seat valve 18 and the switching seat valve 23 have provided between them a mechanical force transmission (in FIG. 2) by means of which the strong force of the valve member is transmitted to the opening side 24 of the switching seat valve 23 when the pressure limiting seat valve 18 responds and is kept open.

FIG. 4 illustrates a structural solution of the embodiment according to FIG. 2, the pressure limiting seat valve 18 and the switching seat valve 23 being here accommodated in a common housing 53 and defining e.g., a screw-in valve cartridge, which is installed in a housing bore that is not shown. In the housing 53 an annular chamber 60 is connected to the working chamber 8a via the line 12. The pressure line branch 4 leads to the smaller pressure application surface 20, whereas the pressure line branch 5 is connected to the spring chamber 37, in which the spring 29 acts on a shaft 54 of the valve member 33 via a spring cap 55 provided with the manual emergency operation handle 39. The shaft 54 is connected to the large-diameter piston 34 having in the chamber 22a the larger pressure application surface 22 and defining with the inner wall of the housing 53 in the chamber 22a the restriction means 17. A chamber 30 defined on the back of the piston 34 communicates with the tank line 16, 14, so does a chamber 59. A seat 58 is formed between the annular chamber 60 and the chamber 59 in the housing 53, and a seating area 57 cooperates with said seat 58, said seating area 57 being formed on the outer side of a valve piston 56 of the switching seat valve 23 which is configured as a hollow stepped piston. The valve piston 56 offers in the chamber the opening side 24, which is adapted to be acted upon at least by the pressure in the tank line in the opening direction. In addition, the closing side 25 is located opposite the rear of the large-diameter piston 34 at the depicted closed position, so as to be axially displaced by said large-diameter piston 34 when the pressure limiting seat valve 18 responds, until the seating area 57 has raised from the seat 58 and the annular chamber 60 communicating with the working chamber 8a has been connected to the tank line 16, 14. The restriction 6 is accommodated in the valve piston 56 in at least one axial passage 61, said restriction 6 being effective between the spring chamber 37, which is connected to the pressure line branch 5, and the annular chamber 60.

Function of the Embodiment According to FIGS. 2 and 4:

In the pressureless state, the components occupy the position shown in FIG. 4. The piston 8 is e.g., fully retracted. If the pump 1 is switched on, pressure builds up in the spring chamber 37, said pressure being transmitted to the piston 8 via the restriction 6 and the passage 51, the annular chamber 60 and the line 12. The piston starts to move upwards. The restriction 6 generates a pressure difference so that on the closing side 25 of the valve piston 56 a force is generated, which is directed to the right and which holds the seating area 57 on the seat 58 or which presses the valve piston 56 against the seat 58, if said valve piston 56 should still occupy a position that is further to the left than the position shown. As soon as the maximum operating pressure has been reached, the pressure limiting seat valve 18 responds in that the pin-shaped extension 20 of the piston 34 is lifted from the bore, the maximum operating pressure acts on the substantially larger pressure application surface 22 and displaces the piston 34 rapidly to the left against the force of the spring 29. The rear of the piston 34 strikes against the valve piston 56 and displaces the latter to the left against the weaker force on the closing side 25, so that the seating area 57 is lifted from the seat 58 and pressure medium flows off from the working chamber 8a via the line 12, the annular chamber 60, past the seat 58 into the chamber 59 and from said chamber into the tank line 16, 14. The maximum operating pressure on the larger pressure application surface 22 decreases, when the pump 1 has been switched off, also via the restriction means 17 into the chamber 30 and from the latter via the tank line 15 into the tank line 16, 14. The valve piston 56 has, however, already been fully opened and maintains, e.g. with the tank pressure, its open position. The pump 1 was switched off approximately at the moment at which the pressure limiting seat valve 18 responded, so that the pressure in the pressure line 3 and in the pressure line branches 4, 5 decreases. The pressure in the tank line 16, 14 is, however, still effective on the opening side 24, whereas the pressure on the closing side 25 vanishes, so that the switching seat valve 23 will remain at the open position while the piston continues its return stroke. If, at a selected return stroke position, the pump is switched on for a short period of time, the resultant volume flow pulse will generate via the restriction 6 a force on the closing side 25, which causes the valve piston 56 to return to the closed position shown in FIG. 4, so that the piston 8 stops. If the pump 1 is switched on and maintained in the switched-on state, the piston 8 will reverse its direction of movement and start an a new operating cycle.

The switching seat valve 23 in FIGS. 2 and 3 may also be provided with a mechanical lock 26. In this case, it may possibly no longer be necessary to apply the tank pressure to the opening side.

The pressure limiting seat valve 18 and the switching seat valve 23 in FIGS. 1 to 4 form, in the modes of installation explained, a reliably operating valve arrangement V, which is expedient for use with hydraulic drives of tools, but which is also adapted for other cases of use with a hydro-consumer that is e.g., adapted to be acted upon against a load on one side thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hydraulic drive for a tool, the hydraulic drive comprising:
    a pump;
    a valve arrangement including a pressure limiting seat valve and a switching seat valve;
    a working chamber;
    a piston in the working chamber, the piston being adapted to be acted upon on one side thereof against a permanent load by the pump, which is operable in a switch-off mode, via the valve arrangement;
    a pressure line from the pump to the working chamber;
    a restriction provided in the pressure line, wherein the pressure limiting seat valve is configured to respond exclusively to pressure originating from a volume flow in the pressure line upstream of the restriction;
    a tank connected to the pressure limiting seat valve on a flow-off side;
    a drain line connected to the pressure line downstream of the restriction, the drain line leading from the working chamber via the switching seat valve to the tank;
    wherein a closing side of the switching seat valve is adapted to have applied thereto pressure from the pressure line upstream of the restriction, an opening side of the switching seat valve is adapted to have applied thereto a force generated when the pressure limiting seat valve responds, the pressure limiting seat valve has on a spring-loaded valve piston a first pressure application surface, which is adapted to be acted upon by pressure from the pressure line and usable for limiting a maximum operating pressure in the working chamber, and a second larger pressure application surface for keeping the pressure limiting seat valve open, after the pressure limiting seat valve has responded, at least until the pump is switched off, and the pump is adapted to be switched off when a maximum operating pressure has been reached; and a restriction means provided on the flow-off side of the pressure limiting seat valve to the tank for increasing pressure from the pressure line acting on the second pressure application surface of the pressure limiting seat valve, wherein the force on the opening side of the switching seat valve can be generated either mechanically or hydraulically by the pressure limiting seat valve from a raised pressure, when the pressure limiting seat valve responds and when it is kept open.

2. The hydraulic drive according to claim 1 wherein for stopping return stroke of the piston at a selectable return stroke position, the open switching seat valve is adapted to be closed by a volume flow pulse in the pressure line by switching the pump on for a limited period of time.

3. The hydraulic drive according to claim 1 wherein for reversing direction of movement of the piston during a return stroke at a selectable return stroke position, the pump can be switched on again.

4. The hydraulic drive according to claim 1 wherein the restriction means is defined either by a restriction point arranged in a tank branch line leading from the flow-off side of the pressure limiting seat valve to the tank and/or by the tank branch line itself, or is defined in the pressure limiting seat valve.

5. The hydraulic drive according to claim 4 wherein the restriction means is defined in the pressure limiting seat valve near the second larger pressure application surface between the valve piston and a housing of the pressure limiting seat valve.

6. The hydraulic drive according to claim 1 wherein, for hydraulically generating the force on the opening side of the switching seat valve, the pressure limiting seat valve and the switching seat valve are configured as structurally separate valves and are hydraulically connected via a signal line extending from the flow-off side of the pressure limiting seat valve to the opening side of the switching seat valve.

7. The hydraulic drive according to claim 6 wherein the switching seat valve includes a mechanical locking device and is adapted to be mechanically locked at a respective switching position.

8. The hydraulic drive according to claim 6 wherein the pressure limiting seat valve and the switching seat valve each have a housing.

9. The hydraulic drive according to claim 6 wherein the pressure limiting seat valve and the switching seat valve are configured as screw-in valves that each have a housing, and the restriction is arranged in the housing of the switching seat valve in a separate pressure line branch.

10. The hydraulic drive according to claim 1 wherein the switching seat valve is configured to be acted upon by tank pressure from a tank line on the opening side.

11. The hydraulic drive according to claim 1 wherein the switching seat valve is configured such that it does not comprise a spring.

12. The hydraulic drive according to claim 8 wherein the switching seat valve comprises a closing cone in a chamber connected in the housing of the switching seat valve to the tank, the closing cone being connected to a piston, which is displaceable within the housing of the switching seat valve, and being cooperable with a seat that is open towards the working chamber, and wherein, in an annular chamber of the housing of the switching seat valve connected to the pressure line, the piston comprises as the closing side an annular pressure application surface corresponding to only a fraction of a larger pressure application surface of the piston in a chamber of the housing of the switching seat valve connected to the signal line, the larger pressure application surface defining the opening side.

13. The hydraulic drive according to claim 12 wherein the switching seat valve includes a mechanical lock and is adapted to be mechanically locked at a respective switching position, the lock comprising at least one ball, which is resiliently loaded radially inwards in a radial bore of the housing of the switching seat valve, and locking recesses, which correspond to the closed and open positions of the piston, in the circumference of the piston.

14. The hydraulic drive according to claim 13 wherein the locking recesses are adjacent to the larger pressure application surface on the opening side.

15. The hydraulic drive according to claim 1 wherein, for mechanically generating the force on the opening side of the switching seat valve, the switching seat valve and the pressure limiting seat valve are arranged in a mechanically cooperating manner in a common housing connected via a line to the working chamber, via two pressure line branches to the pump and via a tank line to the tank, and wherein a hollow stepped piston having an external seating area is displaceably guided within the housing on a side of the valve piston of the pressure limiting seat valve which faces away from the first pressure application surface and which communicates with the tank, the valve piston having the second larger pressure application surface, and the seating area being cooperable with a seat formed in the housing between a tank connection and a pressure line connection as well as a connection of the line leading to the working chamber.

16. The hydraulic drive according to claim 15 wherein the hollow stepped piston includes the restriction.

17. The hydraulic drive according to claim 15 wherein the pressure line branch leading to the switching seat valve is configured to communicate with a spring chamber of the pressure limiting seat valve facing away from the valve piston of the pressure limiting seat valve and is connected to a passage extending axially through the stepped piston and including the restriction.

18. A valve arrangement for a hydro-consumer which is adapted to be acted upon on one side thereof against a load, the valve arrangement comprising a pressure limiting seat valve connected to a pressure line on an inflow side and to a tank on a flow-off side and a switching seat valve, which is disposed in a drain line and which is adapted to be opened by a force generated when the pressure limiting seat valve responds and to be closed through pressure in the pressure line upstream, relative to a flow direction in the pressure line away from the pump, of a restriction, the pressure limiting seat valve having on a valve piston a first pressure application surface and a second, substantially larger pressure application surface, wherein the flow-off side of the pressure limiting seat valve has associated therewith a restriction means through which the pressure limiting seat valve, after having responded, can be kept open as long as a volume flow flows in the pressure line, and wherein the force opening the switching seat valve and keeping the switching seat valve open can be generated either mechanically by the valve piston or hydraulically from pressure in the pressure limiting seat valve upstream of the restriction means.

* * * * *